United States Patent [19]

Furukawa et al.

[11] 4,313,514
[45] Feb. 2, 1982

[54] STEERING APPARATUS FOR VEHICLES

[75] Inventors: Yoshimi Furukawa, Tokyo; Shoichi Sano, Tokorozawa, both of Japan

[73] Assignee: Honda Giken Kogyo Kabushiki Kaisha, Tokyo, Japan

[21] Appl. No.: 107,717

[22] Filed: Dec. 28, 1979

[30] Foreign Application Priority Data

Dec. 29, 1978 [JP] Japan .................. 53/163678

[51] Int. Cl.³ .................................. B62D 5/06
[52] U.S. Cl. ......................... 180/143; 280/91
[58] Field of Search ............ 180/140, 141, 142, 143, 180/148; 280/771, 91, 96

[56] References Cited

U.S. PATENT DOCUMENTS

| | | | |
|---|---|---|---|
| 3,596,730 | 8/1971 | Cecce | 280/91 |
| 3,972,379 | 8/1976 | Norris | 180/140 |
| 4,105,086 | 8/1978 | Ishii | 180/143 |

*Primary Examiner*—Joseph F. Peters, Jr.
*Assistant Examiner*—Randall A. Schrecengost
*Attorney, Agent, or Firm*—Irving M. Weiner; Pamela S. Burt; John L. Shortley

[57] ABSTRACT

A steering apparatus for vehicles which includes a pinion rotatably mounted on an arm movable longitudinally in response to turning movement of a steering wheel, and a pair of longitudinally movable racks held in meshing engagement with the pinion. One of the racks is operatively coupled with front wheels of the vehicle and with a pivot arm pivotable on a movable pivot which is displaceable along the pivot arm in response to vehicle speeds. The other rack is coupled through a pivotable lever with an arm which is pivotally mounted on the pivot arm and is operatively coupled with the rear wheels. When the steering wheel is turned, the front and rear wheels are turned in the same direction or in opposite directions, depending on the position of the movable pivot on the pivot arm, which position is a function of the vehicle speed. The front and rear wheels are turned in the same direction when the vehicle is running at a high speed, and in opposite directions when the vehicle is running at a low speed. The racks and pinion may be dispensed with and the front wheels operatively coupled only through a connecting rod pivotally connected to a pivot arm pivotally mounted on a movable pivot, the rear wheels being pivotally connected through an arm to the pivot arm.

14 Claims, 6 Drawing Figures

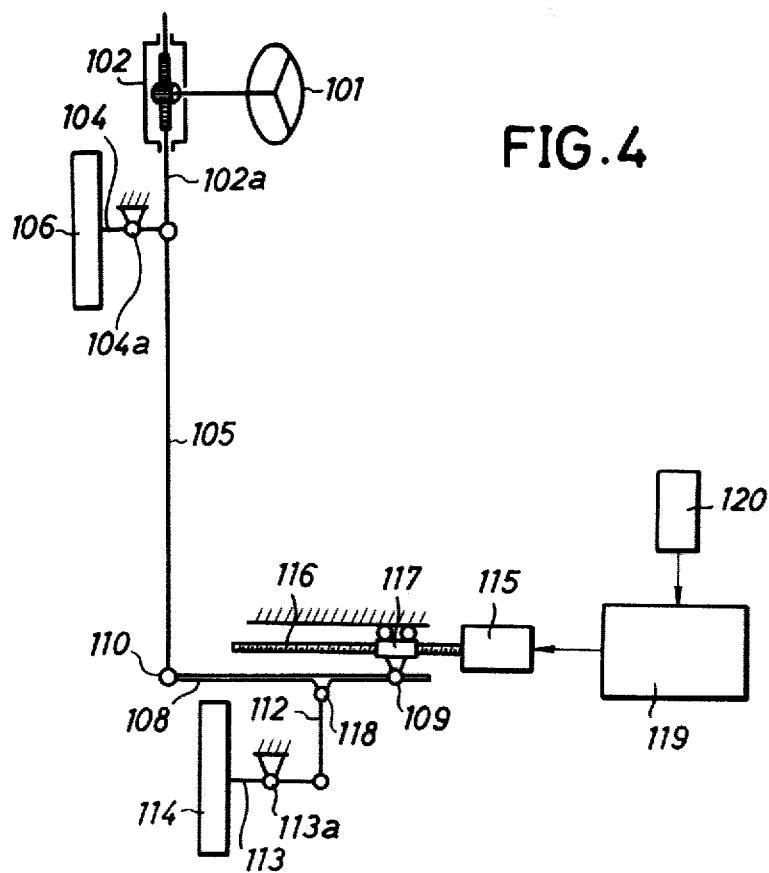
FIG.4
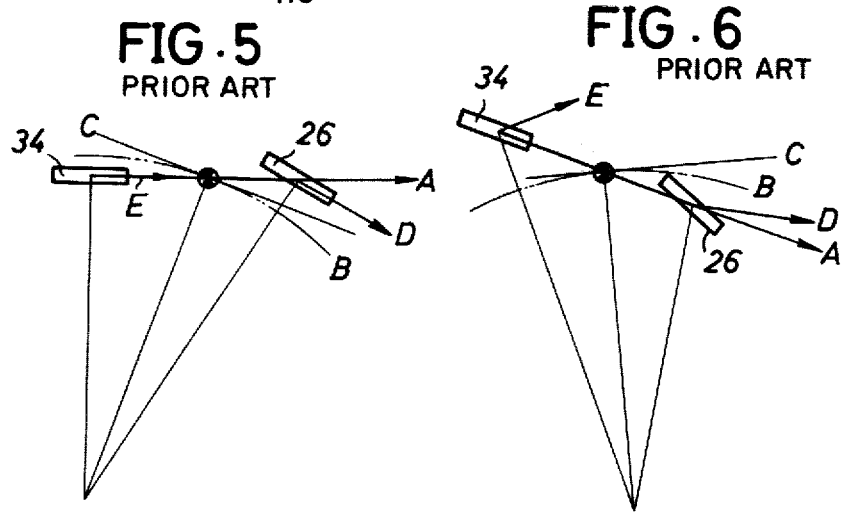
FIG.5 PRIOR ART
FIG.6 PRIOR ART

STEERING APPARATUS FOR VEHICLES

BACKGROUND OF THE INVENTION

1. Field of the Invention

The present invention relates generally to a steering apparatus for four-wheeled vehicles. More particularly, the invention relates to a steering apparatus for changing a ratio between turning angles of front and rear wheels in response to speeds of the vehicle.

2. Description of Relevant Art

Vehicles of the four-wheeled type are generally steered by turning the two front wheels with respect to the longitudinal axis of the vehicle. As the front wheels start to turn while the vehicle is running, an angle of slippage is developed at the front wheels, thereby producing a cornering force which causes the vehicle body to move transversely and to yaw about the center of gravity of the vehicle body.

An angle of slippage is generated at the rear wheels only after the vehicle body has started being displaced due to the yawing movement thereof. Accordingly, a cornering force acts on the rear wheels a short interval of time after the cornering force has acted on the front wheels of the vehicle. In other words, there is a short time lag before the resultant combined cornering forces on the front and rear wheels reaches a value which the driver of the vehicle is expecting. Such time lag causes driving of a four-wheeled vehicle to be more difficult.

While the four-wheeled vehicle is steered to move around, the wheels are subjected to lateral slippage, so that the longitudinal axis or orientation of the vehicle tends to be out of alignment with a tangential line on an arcuate path upon which the vehicle moves. This presents another difficulty in driving a four-wheeled vehicle.

Accordingly, the driver of a four-wheeled vehicle is required to take into consideration a time lag between the turning of the front and rear wheels, and an angular difference between the tangential line on the arc which the vehicle is to sweep, and the longitudinal axis of the vehicle. For proper and safe driving of four-wheeled vehicles, therefore, the driver must have considerable driving experience.

The present invention overcomes the above-described problems by providing a steering apparatus for four-wheeled vehicles wherein a ratio between turning angles of front and rear wheels of the vehicle is variable with vehicle speeds, and the vehicle is provided with an improved steering responsiveness.

SUMMARY OF THE INVENTION

The present invention provides a steering apparatus for a four-wheeled vehicle in which a turning movement of a steering wheel of the vehicle is converted to a straight-line motion through a steering gear for turning front wheels of the vehicle, the steering apparatus comprising means for varying a ratio in the turning angle of the rear wheels of the vehicle relative to the turning angle of front wheels of the vehicle, in response to vehicle speeds.

According to the invention, front wheels of a four-wheeled vehicle are operatively coupled through a connecting rod with a pivot arm pivotally mounted on a movable pivot, the pivot arm being pivotally connected to an arm which is operatively coupled with rear wheels. The movable pivot is movable, in response to vehicle speeds, along the pivot arm past the pivot at which the arm and the pivot arm are connected. When the steering wheel is turned, the front and rear wheels are turned in the same direction during high-speed operation of the vehicle, and in opposite directions during low-speed operation of the vehicle. Accordingly, a ratio between turning angles of the front and rear wheels is variable with vehicle speeds. With the front and rear wheels being dirigible, a cornering force acts on both the front and rear wheels just after steering is commenced, and thus the vehicle is subjected to a required degree of lateral acceleration in a short period of time.

The turning-angle ratio approaches 1 as the vehicle speed becomes higher during high-speed operation, and approaches −1 as the vehicle speed decreases during low-speed operation. With such an arrangement, the orientation of the vehicle is in substantial accord with a tangential line on an arc which the vehicle is to sweep.

The rear wheels can be locked against being turned, and only the front wheels will remain dirigible, with the turning-angle ratio being zero, when the vehicle speed is below a predetermined value, so that the vehicle can be driven easily especially when it is to be parked, pulled over, or driven along a narrow road, for example.

It is an object of the present invention to provide a steering apparatus for vehicles which overcomes the above-discussed problems attendant four-wheeled vehicles.

Another object of the present invention is to provide a steering apparatus for four-wheeled vehicles in which a ratio between turning angles of front and rear wheels of the vehicle is variable with vehicle speeds.

Still another object of the present invention is to provide a steering apparatus having an improved steering responsiveness.

A further object of the present invention resides in the provision of a steering apparatus which permits the driver to steer a four-wheeled vehicle with maximum ease.

The above and other objects and advantages of the present invention will become apparent from the following detailed description when read in conjunction with the accompanying drawings, wherein preferred exemplary embodiments of the invention are illustrated.

BRIEF DESCRIPTION OF THE DRAWINGS

FIG. 4 is a view similar to FIG. 1, showing another embodiment of the invention.

FIGS. 5 and 6 are diagrammatic views depicting relations between the orientation and path of turning movement of an automotive vehicle equipped with a conventional steering apparatus.

DETAILED DESCRIPTION OF PREFERRED EMBODIMENTS

In the following description, only left-hand front and rear wheels are described for the purpose of explaining the structure and operation of the steering apparatus according to the present invention. Although not shown, it will be understood that right-hand front and rear wheels are operatively coupled to the left-hand wheels by tie rods, for example, for cooperative movement therebetween.

Figure 1:
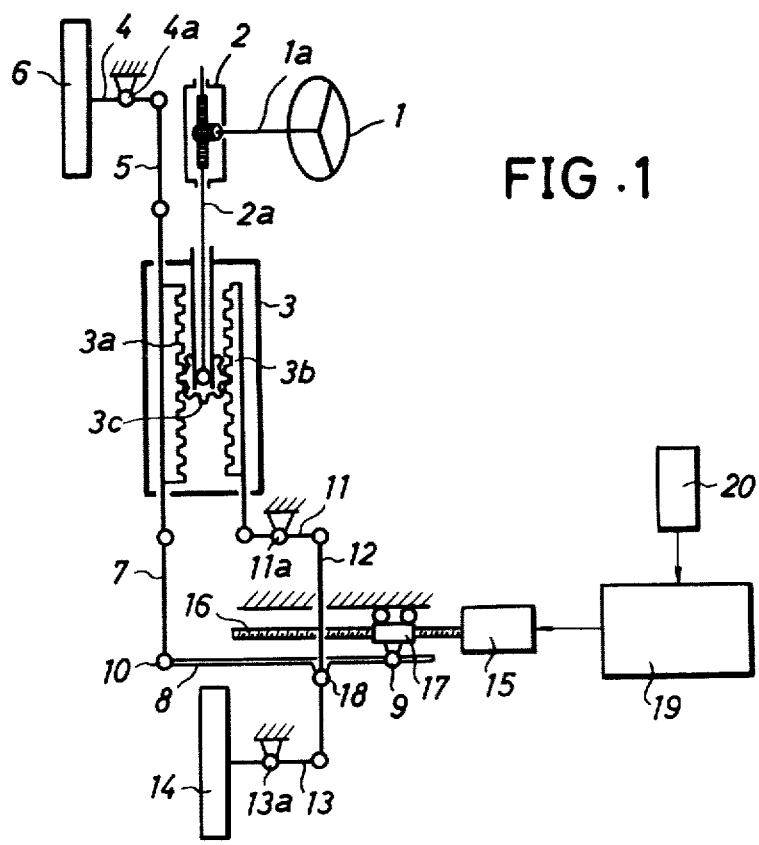
FIG. 1 depicts a schematic plan view of a steering apparatus in accordance with the present invention.

With reference to FIG. 1, a steering wheel 1 is concentrically connected to a steering shaft 1a which is operatively connected to a steering gear 2 of a known type, such as a rack and pinion. An arm 2a, capable of straight-line motion through the steering gear 2 in response to turning of steering wheel 1, extends into a differential device 3 and is provided on the distal end thereof with a rotatable pinion 3c. The differential device 3 includes a pair of parallel racks 3a, 3b which are longitudinally movable and held in meshing engagement with pinion 3c. A front end of the rack 3a is pivotally coupled via a connecting rod 5 with a support member 4, such as a knuckle arm pivotable about a pivot 4a and supporting a front wheel 6, which is turnable or dirigible in response to back-and-forth movement of rack 3a. There is thus defined first means for transmitting steering movement of steering wheel 1 to the front wheels of the vehicle. A rear end of rack 3a is pivotally connected by a cponnecting rod 7 to one end of a pivot arm 8 which is pivotally movable about a pivot 9 adapted to move or slide on and along the pivot arm 8. Thus, the pivot arm 8 and the front-wheel support member 4 are operatively interconnected by the rack 3a.

The rack 3b has a rear end thereof pivotally connected to one end of a lever 11 which is pivotable on a central pivot 11a, the other end of lever 11 being pivotally connected to one end of a rearwardly extending arm 12 pivotally mounted on the pivot arm 8 by a pivot 18. The other end of arm 12 is pivotally connected to a support member 13, such as a knuckle arm, supporting a rear wheel 14. Thus, the arm 12 operatively interconnects the pivot arm 8 and the support member 13, and is operatively coupled via the lever 11 with the rack 3b. The support member 13 is pivotable on a pivot 13a, such that the rear wheel 14 can be turned or is dirigible in response to pivotal movement of pivot arm 8 about movable pivot 9. There is thus defined second means for transmitting steering movement of steering wheel 1 to the rear wheels of the vehicle.

When the steering wheel 1 is turned in a clockwise direction in FIG. 1, the arm 2a is pushed rearwardly, or downwardly in FIG. 1, producing a rearward force acting upon the racks 3a, 3b. Such rearward force also acts on a pivot 10 connecting the connecting rod 7 and the pivot arm 8, and on pivot 18 connecting the pivot arm 8 and the arm 12. Accordingly, a moment tending to move the pivot arm 8 angularly about the pivot 9 in the rearward direction is produced at pivot 10, and a moment tending to move the pivot arm 8 angularly about the pivot 9 in the forward direction is produced at pivot 18. Because the pivot 9 is disposed rightwardly of pivots 10 and 18, the moment at pivot 10 prevails over that at pivot 18, resulting in rearward, or downward, pivotal movement of pivot arm 8. Thus, the rack 3a moves rearwardly and the rack 3b moves forwardly in opposite directions, as the pinion 3c is rotated to take up differential motion between the racks 3a, 3b.

With clockwise turning of steering wheel 1, the front wheel 6 is turned to the right and, at the same time and in response thereto, the rear wheel 14 is turned to the right. A ratio between turning angles of the front and rear wheels 6, 14 is dependent upon a distance between the pivots 9 and 10 and upon a distance between the pivots 9 and 18, and such ratio can be determined by selecting the position of the pivot 9 on the pivot arm 8.

The pivot 9 is mounted on an internally threaded carrier 17 threadedly engaging a screw rod 16 which is rotatable in either direction, and which can be stopped by a motor 15 controllable by a control 19 which receives signals from a vehicle-speed sensor 20. The screw rod 16 is rotated by the motor 15 to permit carrier 17 to move along the screw rod 16 until the carrier 17 reaches a position which corresponds to a vehicle speed sensed by the vehicle-speed sensor 20, whereupon the control 19 de-energizes the motor 15. The arrangement of control 19 is such that as the vehicle speed increases, the movable pivot 9 moves away from pivot 18, and conversely as the vehicle speed decreases, the pivot 9 moves toward pivot 18. When the vehicle speed is lowered beyond a predetermined value, the movable pivot 9 moves past the pivot 18 into a region on the pivot arm 8 which is between pivots 10 and 18.

With the movable pivot 9 disposed between pivots 10 and 18 on pivot arm 8, when steering wheel 1 is turned clockwise, the racks 3a, 3b tend to move rearwardly, thereby producing a moment at pivot 10 and a moment at pivot 18, both moments jointly causing pivot arm 8 to turn on pivot 9 in the same direction. Thus, even if the distance between pivots 10 and 9 is shorter, the pivot arm 8 can be pivotally moved reliably about pivot 9. The direction of turning of pivot arm 8 remains the same regardless of whether the pivot 9 is disposed rightwardly or leftwardly of pivot 18. Such mode of operation is made possible by the pivotable lever 11 pivotally connecting arm 12 to rack 3b such that arm 12 can move in either direction with respect to connecting rod 7 connected to rack 3a.

When the movable pivot 9 is disposed between pivots 10 and 18, the front wheel 6 is turned to the right by clockwise turning movement of steering wheel 1, and at the same time the rear wheel 14 is turned to the left in response thereto. In other words, the front and rear wheels 6, 14 are turned in opposite directions. A ratio between turning angles of the front and rear wheels 6, 14 with the pivot 9 thus disposed corresponds to a predetermined vehicle speed and is controllable by control 19.

From the foregoing, it will be understood that in accordance with the invention there is thus provided third means (i.e., pivot arm 8) for urging the aforesaid first and second means to operate in first directions of operation causing the front and rear wheels to be steered in the same direction at relatively high speeds of the vehicle and to operate in second directions of operation causing the front and rear wheels to be steered in opposite directions at relatively low vehicle speeds.

The front and rear wheels are turned in the same direction when the vehicle is steered during high-speed operation thereof, so that a cornering force is developed on the front and rear wheels simultaneously even just after the steering operation is commenced. Therefore, the necessary transverse acceleration the driver of the vehicle is expecting is reached in a short period of time, resulting in an improved steering responsiveness.

As the turning angle of the steering wheel is increased with the vehicle speed being lowered, the steering responsiveness is not greatly improved. However, the steering responsiveness during low-speed operation of the vehicle is not particularly important for practical purposes.

FIGS. 2 and 3, and FIGS. 5 and 6 illustrate a comparison as to steering operation between a vehicle equipped with the steering apparatus in accordance with the present invention, and a vehicle equipped with a conventional steering apparatus. Although the vehicles are shown as being two-wheeled, it will be understood that the illustration is applicable to a vehicle wherein the turning radius thereof is sufficiently larger than a wheel track between the right and left wheels, such as a conventional four-wheeled vehicle.

With reference to FIGS. 5 and 6, a vehicle having a front wheel 26 and a rear wheel 34 is steered by turning the front wheel 26 only. While the vehicle is steered at a relatively low vehicle speed, the directions D, E, of movement of the wheels are the same as the orientations thereof, respectively, and the vehicle is oriented in a direction A directed radially outwardly of a line C tangent to the arcuate path B which the vehicle is to sweep, as shown in FIG. 5. As the vehicle speed increases, an angle of slippage is developed at the front and rear wheels 26, 34, and the moving directions D, E of the wheels 26, 34 become directed radially outwardly of the respective orientations of the wheels (FIG. 6). Therefore, the center of the arcuate path for the vehicle moves gradually forwardly, and the tangential line C on the arcuate path B is directed radially outwardly of the line of axis of the vehicle or the orientation thereof.

Figures 2, 3:
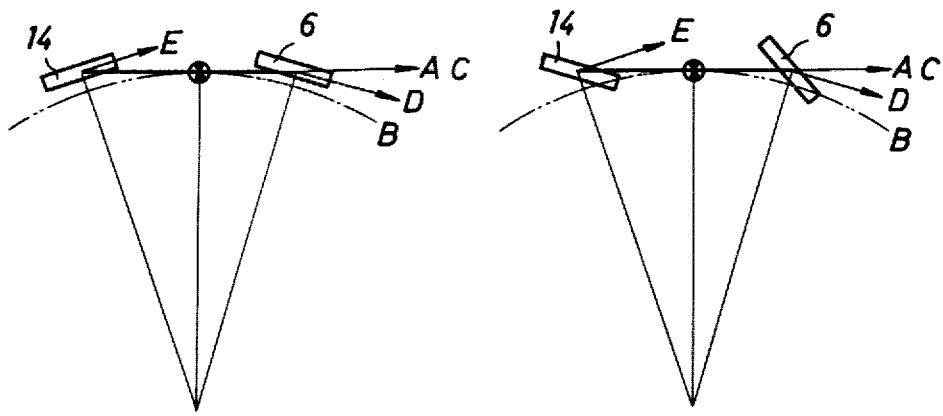
FIGS. 2 and 3 are diagrammatic views illustrating relations between the orientation and path of turning movement of an automotive vehicle equipped with the steering apparatus according to the present invention.

According to the present invention, the front and rear wheels 6, 14 are turned in opposite directions while the vehicle is running at a low speed. With the turning-angle ratio between the front and rear wheels 6, 14 being selected in accordance with vehicle characteristics, the orientation A of the vehicle substantially conforms to the tangential line C on the arcuate path B for the vehicle, as shown in FIG. 2. As the vehicle speed is increased, the rear and front wheels 14, 6 are turned in the same direction. Therefore, the orientation A of the vehicle conforms to the tangential line C on the arcuate path B for the vehicle, as illustrated in FIG. 3. In this manner, the prior art problem is effectively solved.

With the steering apparatus of the present invention, furthermore, a turning radius of the vehicle can be minimized. Generally, a limitation is imposed on the minimum turning radius of the vehicle because the brake hoses are provided between the wheels and the vehicle body, the wheel housing dimensions are restricted, and the operating angle of joint for coupling shafts is restricted where the dirigible wheels are driving wheels. However, according to the present invention, such limitation can be reduced by substantially half. In addition, the front and rear wheels roll on substantially the same arcuate path of the turning vehicle.

A steering apparatus in accordance with another embodiment of the invention will be described with reference to FIG. 4. A steering wheel 101 is operatively coupled by a steering gear 102 with an arm 102a which is longitudinally movable and is pivotally connected to a support member 104 for a front wheel 106. The front wheel 106 is turned in response to pivotal movement of support member 104 on a pivot 104a when the arm 105 is moved longitudinally. A pivot arm 108 is pivotally movable back and forth on a movable pivot 109, and is operatively connected by a pivot 110 and a connecting rod 105 to support member 104. Thus, in the present embodiment, the support member 104 and pivot arm 108 are interconnected only by connecting rod 105. The pivot arm 108 has a pivot 118 to which there is pivotally connected an arm 112 which is in turn pivotally connected to a support member 113 for a rear wheel, the support member 113 being pivotally movable on a pivot 113a. Upon pivotal movement of pivot arm 108, the support member 113 is pivotally moved on pivot 113a, whereupon the rear wheel 114 is turned. Accordingly, the front and rear wheels 106, 114 are turned together in response to turning of steering wheel 101.

The pivot 109 is mounted on an internally threaded carrier 117 movable on and along a screw rod 116, and the position thereof is variable along screw rod 116. The pivot 109 is longitudinally movable on and along the screw rod 116 upon rotation of screw rod 116 which is actuated by a motor 115 controllable by a control 119 which receives signals from a vehicle-speed sensor 120. The screw rod 116 can be rotated in one direction, the opposite direction, or can be stopped, by the motor 115. The movable pivot 109 is changed in position along the pivot arm 108.

With the embodiment illustrated in FIG. 4, as with the previous embodiment, a ratio as to turning angles of front wheel 106 and rear wheel 114 is changeable in response to vehicle speed. As the vehicle speed is increased, such turning ratio approaches 1, and when the vehicle is running at a lower speed, the ratio approaches −1. Only the front wheel can be turned during low-speed driving of the vehicle, with the movable pivot 109 being brought to a position conforming to pivot 118.

Although certain preferred embodiments of the invention have been shown and described, it will be understood that changes and modificatons may be made therein without departing from the scope of the present invention as defined by the appended claims.

We claim:

1. A steering apparatus for a four-wheeled vehicle, comprising:
   first means for transmitting steering movement of a steering wheel to front wheels of said vehicle;
   second means for transmitting said steering movement to rear wheels of said vehicle;
   said first and second means being operable in first directions of operation causing said front and rear wheels to be steered in the same direction, and in second directions of operation causing said front and rear wheels to be steered in opposite directions; and
   third means for urging, in response to the relative speed of said vehicle, said first and second means to operate in said first directions of operation at relatively high values of said speed and in said second directions of operation at relatively low values of said speed.

2. A steering apparatus according to claim 1, wherein:
   a ratio in the turning angle of said rear wheels of said vehicle to the turning angle of said front wheels of said vehicle approaches a value 1 as the relative vehicle speed increases while the vehicle is running at a relatively high speed.

3. A steering apparatus according to claim 1, wherein:
   a ratio in the turning angle of said rear wheels of said vehicle to the turning angle of said front wheels of said vehicle approaches a value −1 as the relative vehicle speed is reduced while the vehicle is running at a relatively low speed.

4. A steering apparatus according to claim 1, wherein:
   a ratio in the turning angle of said rear wheels of said vehicle to the turning angle of said front wheels of said vehicle is substantially zero during ralatively low-speed running of the vehicle.

5. A steering apparatus according to claim 1, wherein:
said second means includes support members on which said rear wheels are respectively supported, said support members being pivotally movable on respective pivots; and
said third means includes a pivot member pivotally movable on a movable pivot and operatively coupled with the support member for said rear wheels.

6. A steering apparatus according to claim 5, wherein:
said pivot member and said support member for said rear wheels are connected by an arm member; and
said movable pivot is movable along said pivot member past a pivot connecting said arm member and said pivot member.

7. A steering apparatus according to claim 5, comprising:
a threaded carrier on which said movable pivot is mounted; and
a rotatable screw rod with which said carrier threadedly engages.

8. A steering apparatus according to claim 7, comprising:
a motor for rotating said screw rod in one direction and the other, and for stopping rotation of said screw rod in response relative to vehicle speeds.

9. A steering apparatus according to claim 8, cpmprising:
a sensor for sensing relative vehicle speeds; and
a control which receives signals from said sensor for controlling said motor.

10. A steering apparatus according to claim 5, wherein:
said first means includes support members on which said front wheels are respectively supported, said support members being pivotally movable on respective pivots and connected to said pivot member.

11. A steering apparatus according to claim 10, comprising:
a pair of racks;
one of said front-wheel support members being connectedthrough one of said racks to said pivot member;
a pinion disposed between and in meshing engagement with said racks; and
an arm rotatably connected to said pinion and longitudinally movable in response to turning movement of said steering wheel.

12. A steering apparatus according to claim 11, wherein:
said pivot member and said rear-wheel support member are interconnected by an arm coupled with the other of said racks.

13. A steering apparatus according to claim 12, wherein:
said other rack and said arm are interconnected by a lever.

14. A steering apparatus according to claim 10, wherein:
said front-wheel support member is coupled with an arm which is longitudinally movable in response to turning movement of said steering wheel.

* * * * *